June 8, 1937.  T. A. BANNING, JR  2,083,286
VEHICLE AIR CONDITIONING SYSTEM
Original Filed Sept. 29, 1930  7 Sheets-Sheet 1
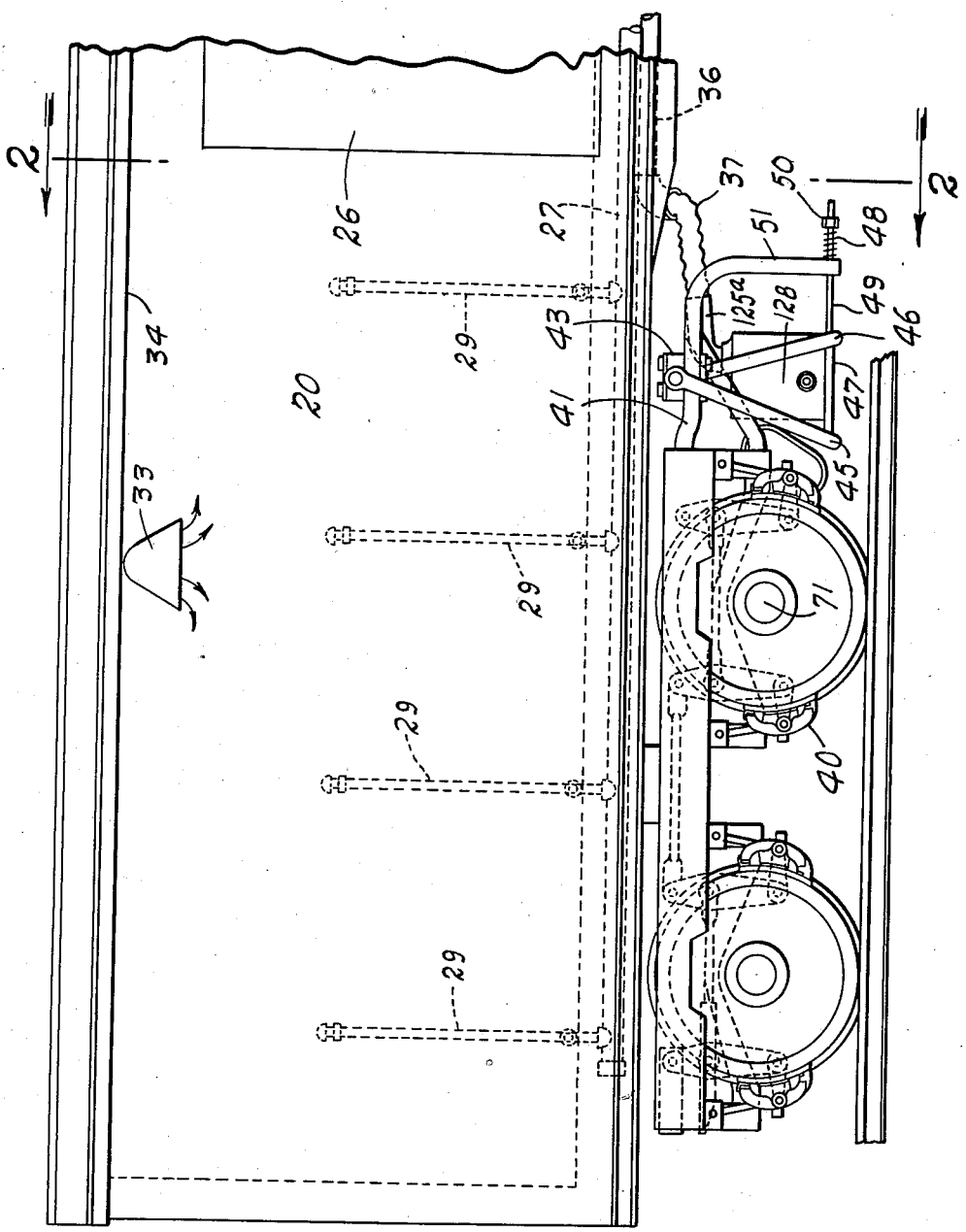
INVENTOR:
THOMAS A. BANNING, JR.
by Oscar Hochberg
his ATTORNEY

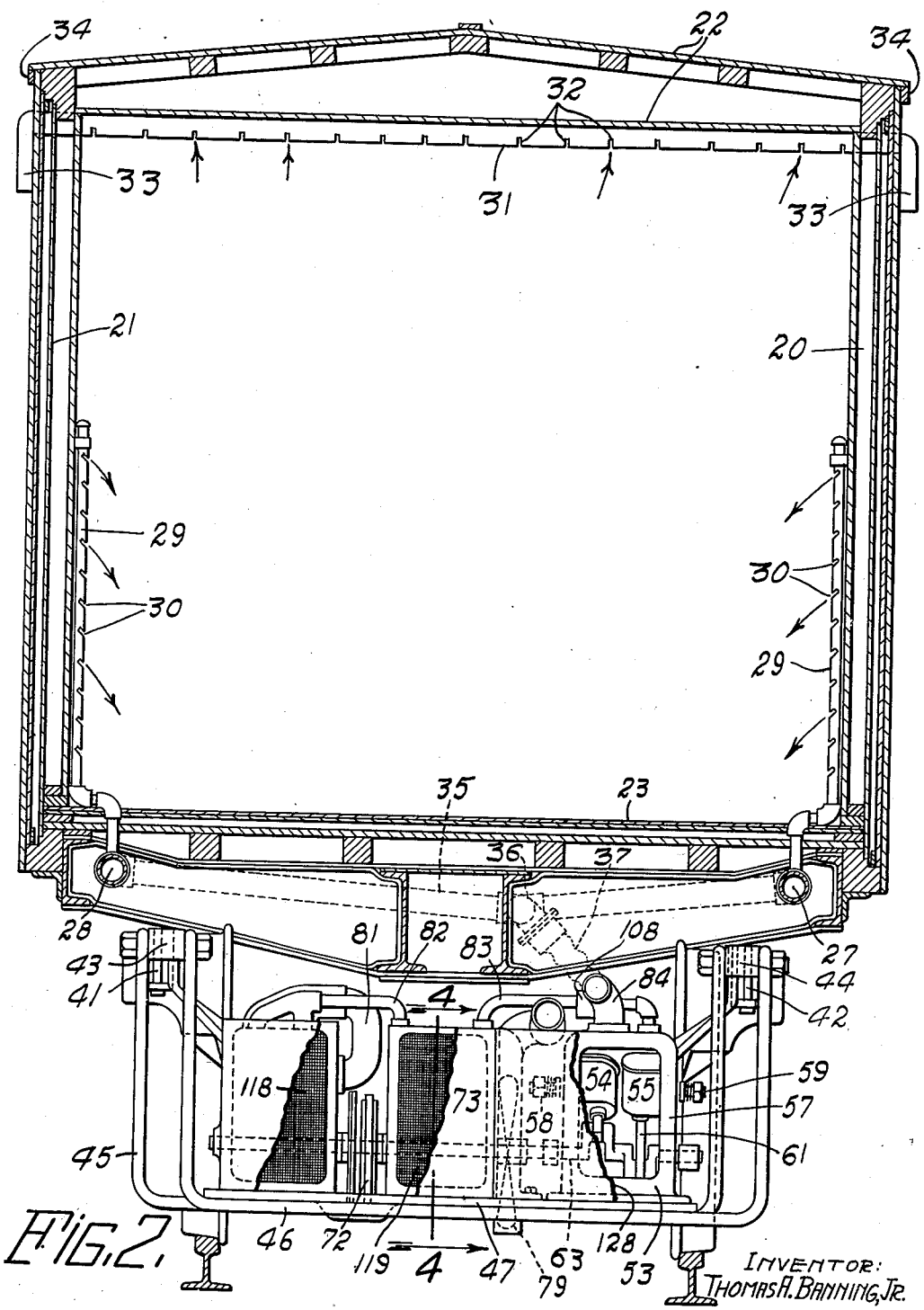

June 8, 1937. T. A. BANNING, JR 2,083,286
VEHICLE AIR CONDITIONING SYSTEM
Original Filed Sept. 29, 1930  7 Sheets-Sheet 3
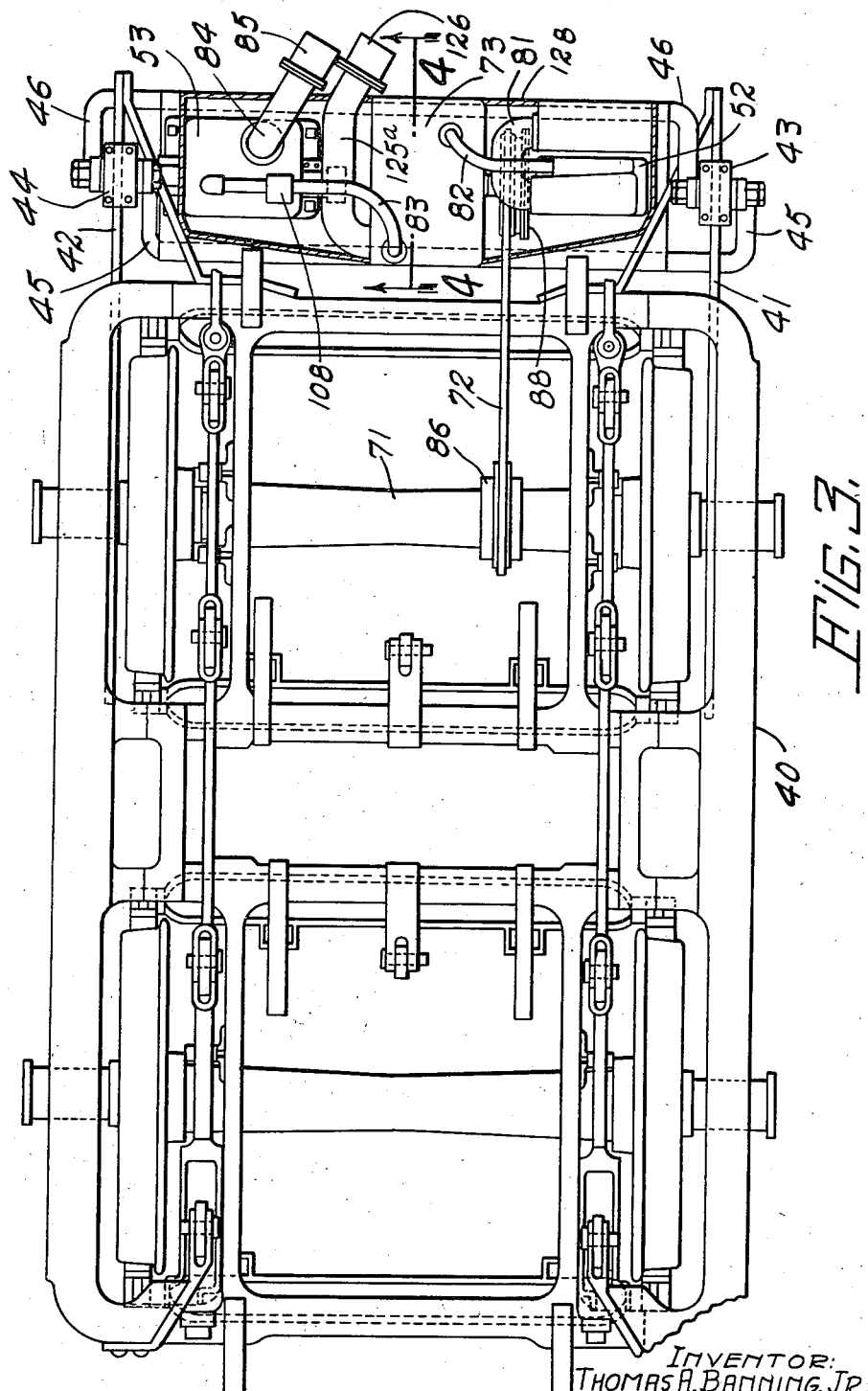

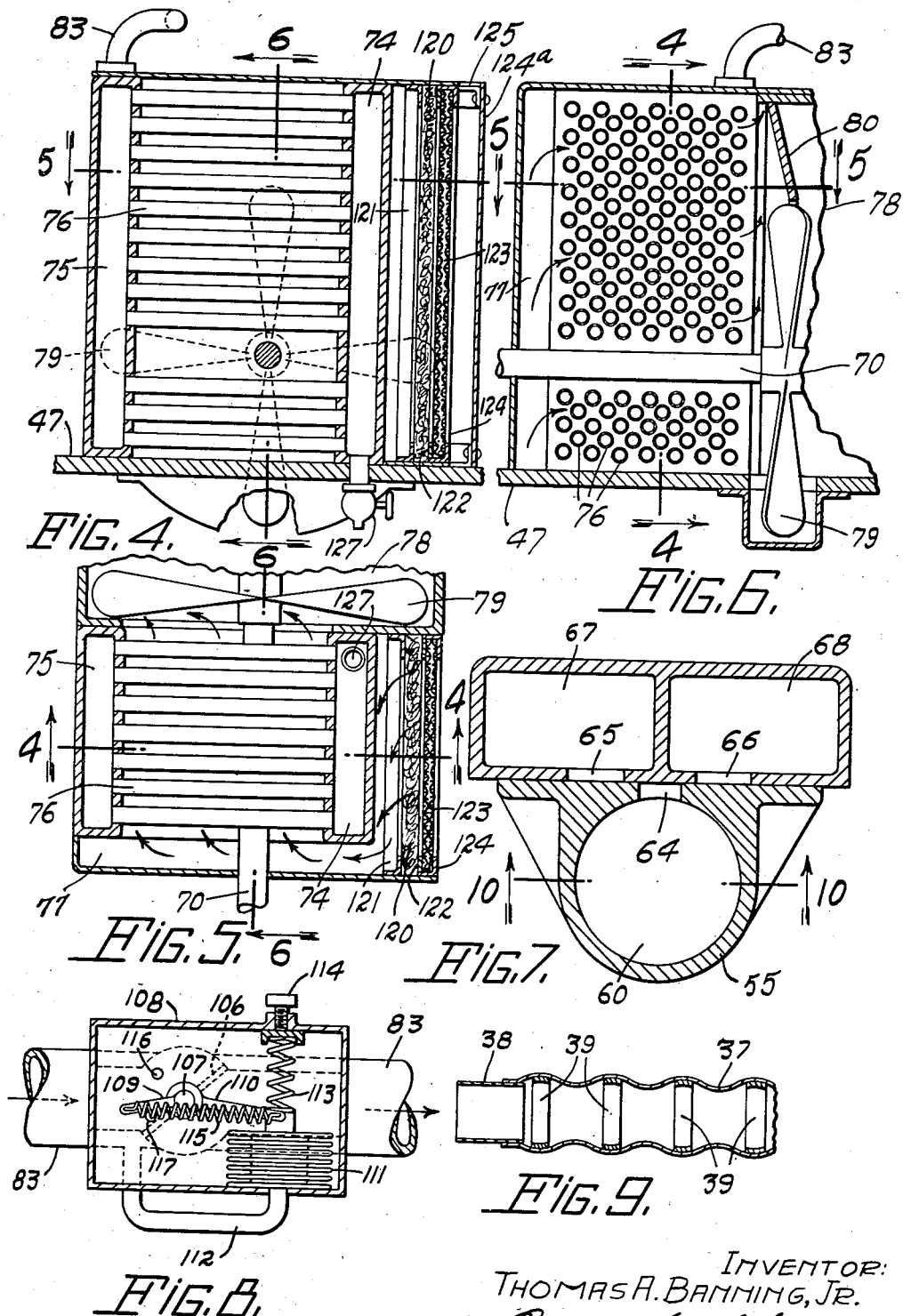

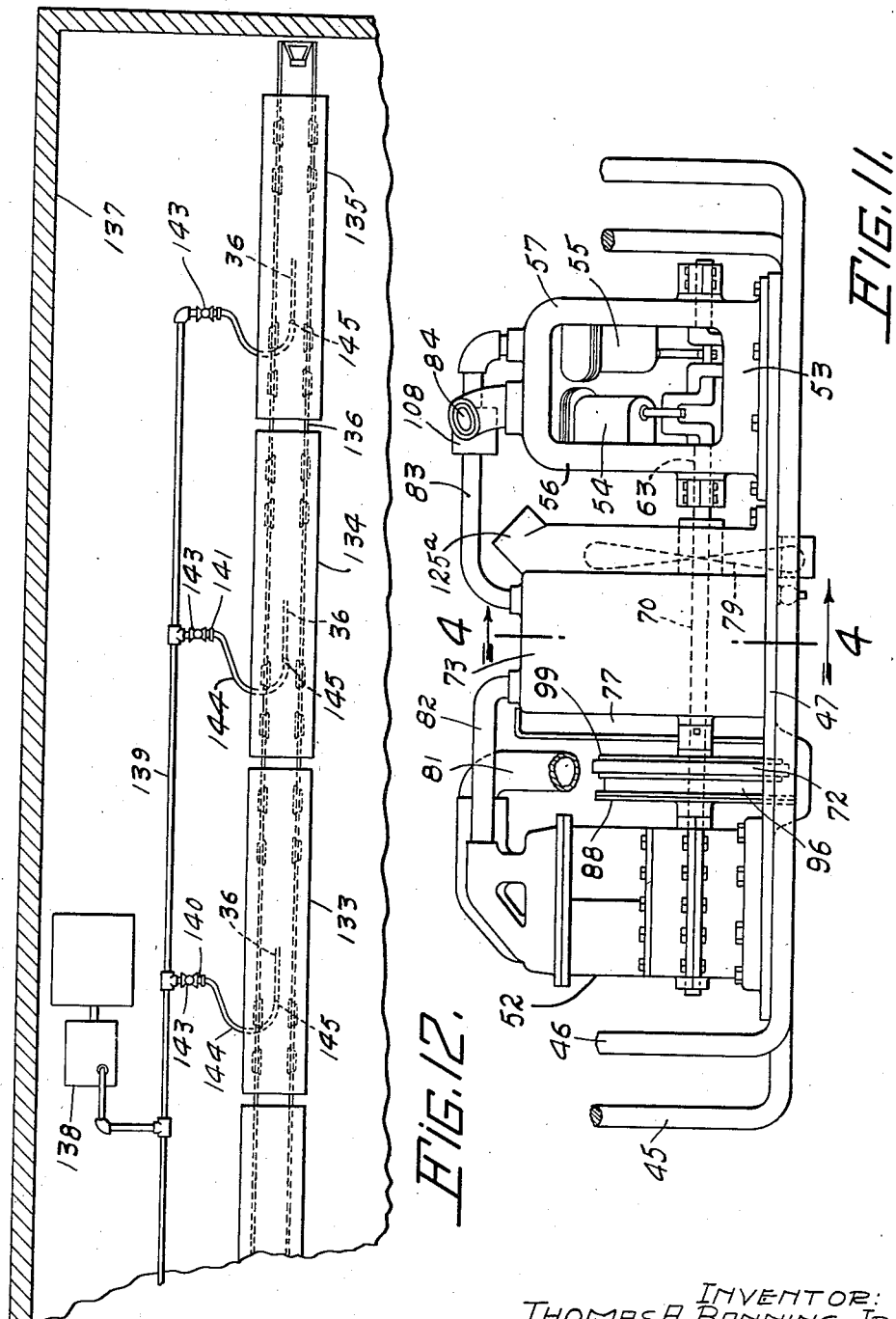

June 8, 1937.　　　T. A. BANNING, JR　　　2,083,286
VEHICLE AIR CONDITIONING SYSTEM
Original Filed Sept. 29, 1930　　7 Sheets-Sheet 7
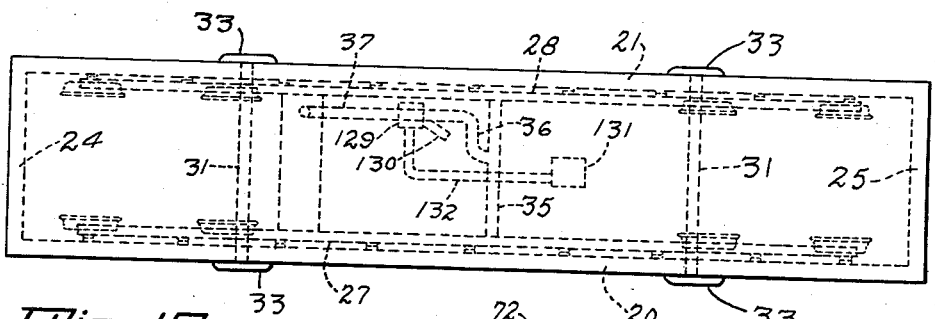
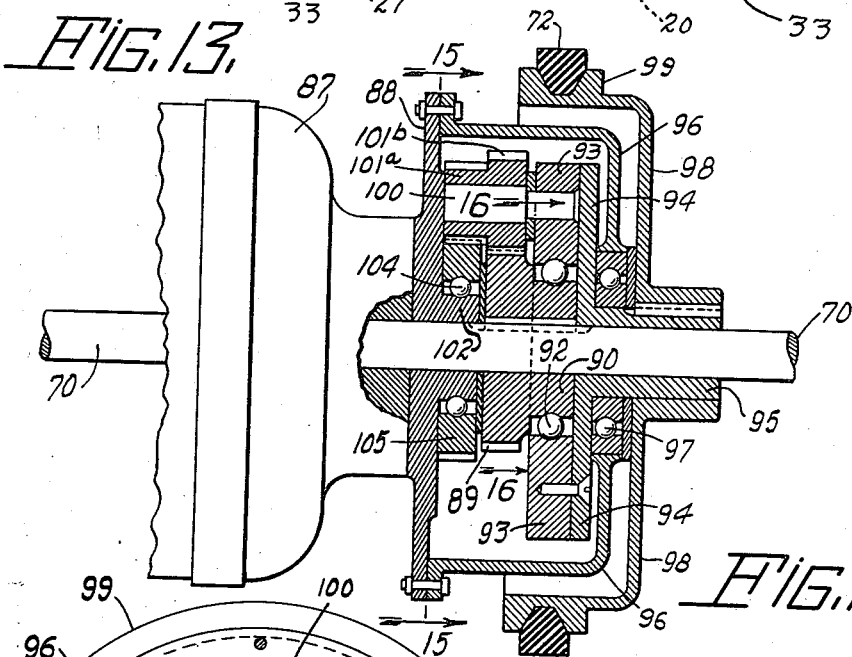
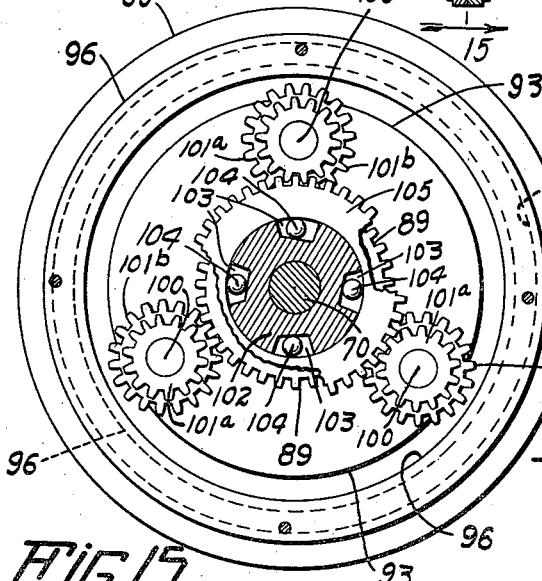
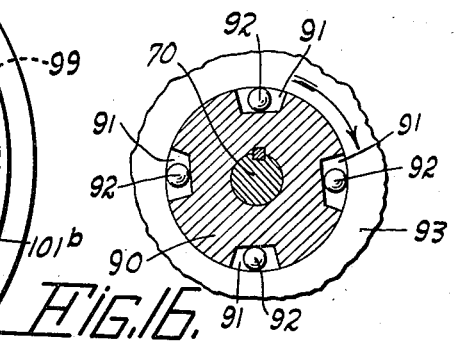
INVENTOR:
THOMAS A. BANNING, JR.
by Oscar Hochberg
his ATTORNEY Patented June 8, 1937

2,083,286

UNITED STATES PATENT OFFICE 2,083,286

VEHICLE AIR CONDITIONING SYSTEM

Thomas A. Banning, Jr., Wilmette, Ill., assignor to Pullman-Standard Car Manufacturing Company, Chicago, Ill., a corporation of Delaware Original application September 29, 1930, Serial No. 485,170. Divided and this application February 14, 1935, Serial No. 6,478

6 Claims. (Cl. 257—7)

This application is a division of my copending application Serial No. 485,170, for Refrigerator cars and the like, filed September 29, 1930.

The present invention has to do particularly with improvements in the air conditioning and ventilation of vehicles. More particularly, the invention has to do with improvements in the refrigerating or air conditioning of railway cars. The features herein disclosed, and the construction herein illustrated and particularly described, have been devised with a view especially to meeting the needs and conditions of refrigerator car construction and operation, but certain of said features may also be advantageously used in connection with air conditioning and ventilating other types of cars, such as, for example, sleeping cars, passenger coaches, dining cars, parlor cars, observation cars, etc. Certain of said features are also well adapted for use in connection with air conditioning and ventilating other enclosures, such as rooms, auditoriums, etc. Therefore, I do not intend to limit myself particularly to the use and application of said features for refrigerator cars, except as I may do so in the claims.

One of the features of the invention relates to an arrangement by means of which the car may be supplied with cold air for refrigeration purposes, the cold air being generated directly by compression, cooling and expansion operations, without the necessity of using any intermediate refrigerating medium such as ammonia gas ($NH_3$), carbon dioxide ($CO_2$), sulphur dioxide ($SO_2$), and other similar media. It is a further object of the invention to provide an arrangement whereby the power necessary to operate the compressor is derived directly from one of the axles of a truck.

A further object in some cases is to provide an arrangement in which the refrigerating apparatus for supplying the cold air may be mounted and carried directly by a cradle which is mounted directly on the truck itself, thus making it possible to drive said apparatus directly from the axle without complications due to turning of the trucks in taking curves, etc. This feature also makes it possible to belt-drive the refrigerating apparatus from the axle if desired, and by the use of what is known as a V-belt, or a belt other than an ordinary flat belt. This is of practical advantage since experience has demonstrated that flat belts are frequently tampered with by hobos and other persons seeking belt leather for various purposes, such as shoe repair, etc. By the use of a V-belt this difficulty is overcome and it is possible to use a belt drive which will not be tampered with by such persons as the foregoing.

It is a further object of the invention to provide a system of refrigeration in which the use of air or other gases under heavy compression within the car body itself is entirely eliminated. When the refrigeration of the car body is performed by the use of refrigerating media such as ammonia gas itself, it becomes necessary to use absolutely gas-tight pipes in the car body itself within which such gases are conducted and retained. Due to vibration and other causes it has been found extremely difficult and expensive to install and maintain in serviceable condition refrigerating systems embodying the use of such gases. Furthermore, such gases are invariably used in connection with what are known as closed circuit systems in which the same gas is used over and over again, being compressed and condensed, then expanded and then returned to the compressor for a new cycle of operations. Due to this circumstance, the use of gas like this necessitates return pipes to the compressor. This makes it necessary to carry two pipes to the compressor, one for the outgoing compressed gas, and one for the returning expanded gas. It is extremely difficult, if not impossible, to place the compressors for such closed circuit gas systems on the trucks of the car, both because of the necessity of using two pipes and also because of the difficulty in providing for the necessary amount of relative movement of the trucks with respect to the car body.

It is therefore a further object of the present invention to overcome any of the foregoing difficulties by the use of a direct air system, since by this arrangement it is only necessary to have a single connection from the refrigerating apparatus to the car body, said connection carrying cold air at substantially atmospheric pressure. Furthermore, by the arrangement of the present invention, the air introduced into the car body is not returned to the compressor but is allowed to work out through openings provided therefor so that a constant ventilation and refreshment of the contents and space within the car is maintained at all times.

Another feature in connection with the foregoing is to provide a refrigerating system in which the cold, fresh air is introduced into the car body at numerous points, continuously during the operation of the system, said cold air working upwardly through the car body towards the roof thereof; and there is also provided means for permitting a corresponding exit or deliverance of the warmer air from the upper portion of the interior of the car body. Inasmuch as the rate of circulation through the car body is relatively low, being only sufficient to maintain the desired refrigerating action in the case of a refrigerator car, the exits or delivery openings in the upper portion of the car may be made of relatively small size and extremely simple construction. For these and other reasons it is unnecessary to provide hatches or similar openings in the roof of the car, thereby materially simplifying and reducing the cost of construction of the upper portion of the car.

Another feature of the invention relates to the provision of means for filtering the air which is sent into the car body, so that dust and other foreign matter is removed from it. This will avoid objectionable accumulation of such material within the refrigerated space of the car body. In this connection, the air filter construction is such that it is readily accessible for purposes of cleaning or repair—the filter constituting a portion of the refrigerating unit and being located in a very accessible position. The arrangement is such that the filter can be readily reached and operated upon by a vacuum cleaner or similar device for removing the accumulated dust from time to time.

In connection with the refrigerating unit, it will be noted that the same includes a heat exchanger located between the air compressor and the air motor in which the compressed air is expanded back to atmospheric pressure. This heat exchanger serves the function of cooling the hot, compressed air without lowering its pressure, so that when the compressed air is thereafter expanded in the air motor it is greatly reduced in temperature by the expansion. This heat exchanger is cooled by a circulation of air from the outside of the refrigerating unit, and such cooling air in turn becomes substantially heated by exchange of heat.

Another feature of the invention relates to the provision of an arrangement whereby the air connections leading into the car body may, if desired, be connected to this heat exchanger in such a way as to supply the interior of the car body with warm or hot air from the heat exchanger instead of cold or refrigerated air from the refrigerating unit. Such operation will be performed, for example, in extremely cold weather, at which time it is not only unnecessary to refrigerate the interior of the car, but it actually becomes necessary at times to warm the interior of the car sufficiently to remove the chill in order to prevent freezing of the contents of the car. Such result may be performed by the use of the present apparatus optionally with a very slight change in the connections for the air system. It is also an object to provide means for filtering the air which is drawn over the heat exchanger so that when the same is delivered to the interior of the car it will be clean and filtered as in the case of refrigerated air.

Another feature in connection with the foregoing relates to the provision of a fan or the like for causing the circulation of the air over the exchanger. This fan will not only serve to provide the desired rapidity of circulation over the heat exchanger, but will also insure a proper delivery of the warm air into the car body when such operation is desired. It will be noted that the refrigerated air delivered from the air motor has back of it a considerable pressure if necessary so that it is unnecessary to make special provision for insuring the flow of the same through and into the car body when the refrigeration system is being used.

Another feature of the invention relates to the provision of an arrangement whereby the mechanical power generated by the air motor in expanding the air for refrigeration so as to take out the work of the same, is returned to the same shaft which drives the air compressor. By this means a considerable amount of power is regenerated and returned to the air compressor so that it is only necessary for the car axle to supply an amount of power equal to the difference between the requirements of the air compressor minus the power restored by the air motor. This will greatly increase the efficiency of the machine as a refrigerator.

Other objects and uses of the invention will appear from a detailed description of the same, which consists in the features of construction and combination of parts hereinafter described and claimed.

In the drawings:

Figure 1 shows a side elevation of the end portion of a railway car, together with a truck provided with a refrigerating unit, and also shows the connection whereby the ducts of the car may be connected either to the refrigerating unit or to a precooling plant;

Figure 2 shows a cross-section through the car body looking towards the truck which carries the refrigerating unit, taken on the line 2—2 of Figure 1 looking in the direction indicated by the arrows, certain of the ducts of the car body being shown in dotted lines;

Figure 3 shows a plan view of a truck provided with an end cradle which carries the refrigerating unit, the enclosing housing being cut away to show the interior elements of the refrigerating unit to better advantage;

Figure 10:
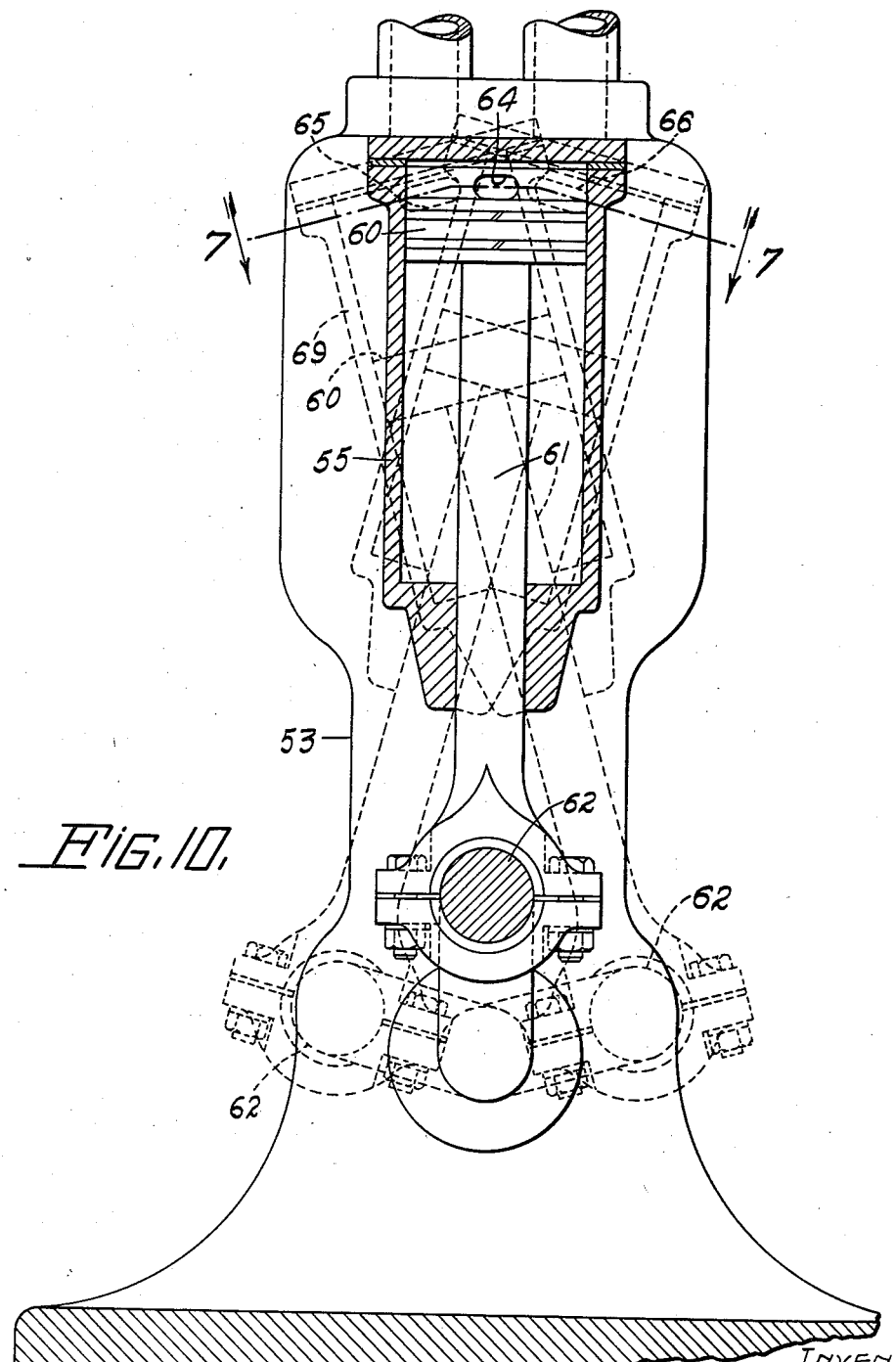

Figure 4 shows a cross-section through the heat-exchanger of the refrigerating unit, taken on the lines 4—4 of Figures 3, 5, 6 and 11 looking in the direction indicated by the arrows, and on enlarged scale as compared to Figures 3 and 11;

Figure 5 shows a horizontal section through the heat-exchanger taken on the lines 5—5 of Figures 4 and 6 looking in the direction indicated by the arrows;

Figure 6 shows a longitudinal section through the heat exchanger taken on the lines 6—6 of Figures 4 and 5 looking in the direction indicated by the arrows;

Figure 7 shows a developed cross-section through the air-motor at the position of the ports taken on the line 7—7 of Figure 10 looking in the direction indicated by the arrows;

Figure 8 shows a longitudinal section through the air-pressure regulated cutout valve, on enlarged scale as compared to Figure 11;

Figure 9 shows a longitudinal fragmentary section through a length of flexible air duct such as may be used for connecting the refrigerating unit of the truck with the ducts of the car body;

Figure 10 shows a vertical section through a cylinder of the air-motor wherein the compressed and cooled air is expanded with consequent extraction of work and reduction of temperature to the final stage, on enlarged scale as compared with Figures 1, 2 and 11;

Figure 11 shows a side elevation of the refrigerating unit of the cradle, with the air filters and enclosing housing removed, on enlarged scale as compared with Figures 1, 2 and 3;

Figure 12 shows diagrammatically a precooling plant arrangement including a track whereon several cars are illustrated, together with a precooling refrigerating plant and the pipe connections for placing the several cars in connection therewith;

Figure 13 shows diagrammatically a car arrangement provided with the features of the present invention, the trucks and principal air ducts being shown in dotted lines;

Figure 14 shows a longitudinal section through a direction changer whereby the shaft of the unit is always driven in the same direction irrespective of changes of the direction of car movement;

Figure 15 shows a cross-section on the line 15—15 of Figure 14 looking in the direction indicated by the arrows; and Figure 16 shows a fragmentary cross-section on the line 16—16 of Figure 14 looking in the direction indicated by the arrows.

Referring first to Figures 1, 2 and 13, I have therein illustrated the features of the present invention as being applied to a refrigerating car. This car has the sides 20 and 21, roof 22, bottom 23 and ends 24 and 25. These parts are heat insulated in the usual manner, so that the car body constitutes in effect a heat insulated enclosure or chamber. The sides are provided with the usual doors, a portion of one being shown at 26. These doors are also heat insulated, and provided with the usual latches or fixtures whereby they are fastened in closed condition and, when so closed, they complete the heat insulated enclosure of the body.

Inasmuch as the cold air for refrigerating the interior of this heat insulated car body is derived from the exterior of such body, the entire space within the body is available for receiving and retaining the merchandise or commodities being shipped under refrigeration. Consequently there is no loss of space due to the presence of bunkers for ice or the like, nor is there any space required within the car body for accommodation of refrigerating apparatus. Furthermore, inasmuch as the refrigerating action is performed by introducing cold air into the body from a refrigerating unit located outside of the car body, said air flows upwards and through the car body, thereby performing its refrigerating and ventilating action, and it is unnecessary to provide any hatches or openings in the roof of the car such as are used for introduction and adjustment of ice in previous forms of refrigerator cars.

Extending along in the lower portion of the car are the cold air ducts 27 and 28 which are located beneath the side walls of the car or close thereto and are preferably heat insulated so as to prevent unnecessary loss of cooling efficiency of the cold air traveling in them. Extending upwardly from these ducts are the branch ducts 29. These are located close to the side walls and either within the side walls or close to the inner faces of said walls, as illustrated in Figure 2 in particular. These branch ducts extend up the full height of the interior of the car body, or a portion of said height as illustrated, and may be provided with openings 30 through which the cold air is delivered into the interior of the car body. These openings are conveniently made in the form of thin slots such as shown, and preferably said slots slant upwards as shown so that the cold air as delivered will naturally tend to settle down into the lower part of the car space. As the cold air accumulates within the car space, it fills the latter and the warmer air is constantly displaced upwardly, until finally the entire interior of the car body is filled with air of the desired temperature.

There are one or more vents provided in the upper portion of the car body through which the warmer air is displaced and delivered out of the car body. These vents may be of convenient form, and may be very simple since they serve merely to allow a constant outward delivery of the warmer used air from the car body, such outward delivery being exactly in harmony with the introduction of the fresh, cold air from the refrigerating unit. The form of vents shown comprise cross ducts 31, preferably two in number, extending across the car body near the roof thereof and provided with openings 32 thru which the warmer air enters. The ends of these ducts 31 reach to the exterior of the car body, preferably terminating just outside of the walls 20 and 21, and being provided with fixtures 33 on their outer ends. These fixtures 33 are preferably flattened out so that they provide the necessary cross-sectional area of opening through which the air is delivered to the outside of the car, and at the same time they do not project materially beyond the face of the car wall and are accommodated beneath the eaves of the car roof 34. The result is that the warmer air is delivered out of the car close to the roof thereof.

In practice, the branch ducts 29 may be placed at whatever spacing is decided on, but usually they will be placed relatively close together throughout the length of the car. They can be made relatively small in size, since their number will provide the required amount of total cross-sectional area for conduction of the cold air in such volume as needed.

The central portions of the side ducts 27 and 28 are connected together by a cross duct 35, preferably located under the middle of the car. This duct 35 in turn receives cold air from a duct 36 which extends to a point near one end of the car body, and the entire supply of cold air is delivered through it. As shown in Fig. 9, the end of this duct 36 is provided with a flexible connection 37 which is in turn provided with an end nipple or sleeve 38 of tubing, which end nipple or sleeve may be connected into the proper connection for receiving the cold air. The flexible connection 37 may be of any suitable material, but preferably one which is a good insulator of heat, since thereby the loss of refrigerating efficiency during passage of the air through the same is lowered. For example, this connection may be of heavy canvas of two or more plies, either rubberized or waterproofed and preferably painted so as to make it more air-proof, and also to reduce the heat transmission, and preferably is reinforced by transverse ribs 39 of stiff but somewhat flexible material such as thin steel or bamboo. Tubing such as the foregoing is available on the market. It will resist collapse due to all ordinary forces which it may encounter, but will flex sufficiently for the needs of the present use.

The truck at one end of the car is designated in its entirety by the numeral 40. It is provided with the side bar extensions 41 and 42 which carry the brackets 43 and 44 respectively. The rods 45 and 46 reach downwardly from these brackets, and said rods extend across the truck from one side to the other, the upper ends of the rods being pivotally connected to the respective brackets so that the rods can swing towards and from the body of the truck. A plate 47 is carried by these rods 45 and 46 and constitutes a platform or support for the refrigerating unit.

The cradle as a unit is drawn forwardly from the truck frame by means of springs 48 on rods 49, each of which carries an adjustment nut 50 against which the springs press. The other end of each of the springs 48 presses against a bracket 51 extending downwardly from and forming an integral part of the side bar extensions 41 and 42. The result is that the springs tend to draw the cradle outwardly from the truck frame. The purpose of this is to keep the driving belt under tension, as will presently be apparent.

On the cradle is mounted an air compressor designated in its entirety by the numeral 52. The compressor illustrated is of the two cylinder type, and it has the usual spring seated inlet and delivery valves, the details of which need not be enlarged upon since this compressor as an element does not constitute a portion of my invention, but only in the various combinations hereinafter set forth. There is also an air motor 53 mounted on the cradle, preferably at the end opposite to that of the compressor. This air motor is of the two-cylinder, oscillating cylinder type in which the cylinders oscillate in proximity to stationary blocks through which the air is introduced to the cylinders, and from which the air discharged by the cylinders is taken. The motor cylinders are designated 54 and 55 respectively. They are placed against the inner faces of the blocks 56 and 57 to which the cylinders are pivotally connected by means of the studs 58 and 59 as best shown in Figure 2. Springs on these studs serve to maintain the cylinders in close proximity to the blocks 56 and 57 but permit the cylinders to oscillate.

Each cylinder is provided with a piston 60 (see Figure 10) which connects to a rod 61 reaching down through the lower end of the cylinder. The lower end of the cylinder is closed so as to provide bearings against which the rod 61 works, so that the swinging of the rod back and forth due to rotation of the crank will cause the cylinder to oscillate. The piston rod 61 connects directly to the crank 62 on the motor shaft 63. Each cylinder is also provided with a central port 64 in its upper end and the block 56 or 57, as the case may be, is provided with corresponding inlet and exhaust ports 65 and 66 connecting with the inlet and exhaust passages 67 and 68 in the block. Comparison of Figures 7 and 10 will show that with this arrangement, and assuming that the passage 67 is for incoming compressed air and the passage 68 for outgoing expanded air, and for clockwise rotation when viewed as in Figure 10, when the cylinder tilts to the position of the dotted lines 69, the compressed air is introduced into the cylinder, forcing the piston downwardly, and as this takes place, the cylinder will presently straighten out to a position where the port 65 will be covered, so that further introduction of compressed air will cease. The further downward movement of the piston will cause expansion of the air. Shortly after the cylinder reaches the vertical position, and the piston the bottom of its movement, the cylinder will tilt to the right sufficiently to bring the port 64 into communication with the port 66. Then as the piston moves upwardly in the cylinder the air will be delivered into the passage 68. Near the upper limit of movement, the cylinder will again swing over, thereby closing the port 66, and soon thereafter opening the port 65 to repeat the action.

Preferably the two cylinders 54 and 55 are placed in quartering or right angular relationship, but that is optional. Furthermore, the air motor illustrated is of the single acting type but in some cases it may be desirable to use a double acting arrangement.

The motor and compressor shafts are connected together by a shaft 70 so that they rotate in unison. This shaft 70 is illustrated as being an extension of the motor shaft, but manifestly it may be connected to the motor and compressor shafts by suitable couplings or otherwise.

The shaft 70 is driven by the rotation of one of the truck axles as the car moves along. This is the axle 71. The drive is effected by use of a belt 72 and through the medium of a direction convertor to be presently explained. Preferably the belt 72 is of the V-type as best shown in Figure 14. This is for the reason, among other things, that this type of belt cannot be advantageously used by hobos and others for such operations as repairing shoes, making shoe inserts, etc., since it has been found that in many cases flat belts used on cars have been thus tampered with and destroyed.

There is a heat exchanger 73 located between the compressor 52 and the motor 53. This heat exchanger is provided with headers 74 and 75 connected together by the tubes 76, and the cooling air flows around these headers and tubes so as to cool the compressed air within them. For this purpose there are the cooling air headers 77 and 78 located at the sides of the tube group, so that the incoming cooling air enters through the header 77, flows across the tubes, cooling them and receiving the heat of the compressed air, and the cooling air then leaves through the header 78.

There is a fan 79 placed on the shaft 70 which runs through the body of the heat exchanger, and this fan works within a shroud 80 between the header 78 and the space around the tubes, so that the efficiency of the fan is improved and a better draft of the air flowing across the tubes is produced.

The air for the compressor is received into the same through an inlet or supply pipe 81 of large size, and the compressed air from the compressor is delivered through the pressure pipe 82 of smaller size, since the volume of the air has been reduced by the act of compressing it. The air is also delivered through the pipe 82 at high temperature due to the compressing action. In fact, in the case of a system operating with a compression of, say, 60 lbs. per square inch pressure delivered by the compressor, the temperature of the delivered air will probably approximate 300° F. or higher. This hot air is then delivered to the heat exchanger where its temperature is lowered in an amount depending largely on the temperature of the cooling air available. Thus, for example, in the case of outside air of a temperature of 80° F., the compressed air in the tubes may be lowered to, say, 120° F., and be delivered from the heat exchanger at that lowered temperature, but with its pressure still maintained at the full amount of 60 lbs. per square inch. The volume of the air will of course be reduced, depending on the amount of such cooling action.

The motor serves to take out the work from the compressed air of reduced temperature, and thereby lower the pressure of the air back to atmospheric pressure with corresponding lowering of the sensible heat of the exhausted air. In fact, the temperature of the air delivered from the air motor will be very low, and in the case assumed above it may be as much as zero Fahrenheit or quite a number of degrees below zero. Consequently, the air exhausting from the air motor will be at atmospheric pressure or slightly above, sufficient to insure movement of the air through the ducts, and at a very low temperature. These conditions are ideal for introduction into the body of the car for refrigerating purposes. The volume of air which will be delivered will depend on the rate of compressor and engine rotation.

The cooled air from the heat exchanger passes from the header 75 to the air motor through the pipe 83 of small size, and the expanded and cold air from the air motor is delivered from the same through the delivery pipe 84 of large size. This pipe 84 has on its end a fitting 85 to receive the end fitting 38 of the flexible connection 37, so that the two parts 84 and 37 can be connected together merely by slipping these fittings together. They can likewise be disconnected very easily, but will remain in the connected condition with sufficient force to insure proper operation until intentionally disconnected. In this connection it will be noted that the air pressure existing in these pipes is so low that they will not readily blow apart.

It will be understood that the air motor naturally has a certain direction of rotation under its own power when supplied with compressed air, and that when allowed to rotate in that direction it expands the air and delivers useful work to the shaft 63. This work will be delivered back to the compressor, and will correspondingly reduce the amount of work and power which must be supplied to the unit by the belt. The direction of rotation of the compressor may be the same as that of the air motor, since the compressor will perform its compressing function in either direction of rotation.

Referring now particularly to Figures 14, 15 and 16, I shall describe in detail the means whereby the refrigerating unit is driven from the axle. The axle carries a pulley 86 by means of which the belt 72 is driven. One end of the compressor element is shown at 87 in Figure 14. Secured thereto is the plate 88. Keyed to the shaft 70 is an element including a pinion 89 and a ball or roller clutch block 90, shown in detail in Figure 16. This latter has the sockets 91 for the balls 92. These sockets and balls are so formed that a ring 93 surrounding them will lock to the shaft to drive the shaft when the ring is rotated in the direction of the arrow of Figure 16, which may be called "forward" for purposes of illustration. Thus the ring 93 will directly drive the shaft 70 in the same direction as the ring rotation for "forward" drive.

The ring 93 is connected to a plate 94 which has the sleeve 95 journaled on the shaft 70, said sleeve 95 reaching outwardly along the shaft to a position outside of the casing to be presently described.

There is a casing of cup form 96 which has its edge portion connected to the periphery of the plate 88, and said casing then reaches down to the position of a ball bearing 97 which journals the casing to the sleeve 95. The outer end of the sleeve 95 carries a flange 98, the outer periphery of which carries the grooved ring 99 which receives the belt and is driven thereby.

The plate 94 also carries a series of backwardly reaching studs 100 upon which are journaled double pinion elements. Each of these includes the pinion elements 101$^a$ and 101$^b$, the former being of smaller size than the latter. The larger pinion elements 101$^b$ mesh with the pinion 89 which is keyed to the shaft 70.

The end plate 88, which is stationary, has an inwardly projecting hub member 102 which has the clutch sockets 103 receiving the clutch balls 104. There is a gear member 105 journaled on this hub member 102, and the balls of the clutch just referred to will engage the inner face of this gear member to lock thereto. The smaller pinion elements 101$^a$ mesh with this gear member 105. The clutch sockets 103 are so formed that they will clutch the balls 104 when the gear member 105 tends to rotate "backwardly"—that is, against the "forward" rotation already referred to, but will allow the gear member 105 to turn freely in the "forward" direction.

Assuming that the belt and pulley member 99 are driven in the "forward" direction, the clutch ring 93 will directly lock to the member 90, and the shaft will be driven "forward"; and at the same time the plate 94 will carry the pins or studs 100 with it in the "forward" direction.

As the pinion elements 101$^b$ are constantly in mesh with the gear 89, and since said gear is rotating "forward" with the shaft and at the same speed as the studs 100, it follows that the pinion elements 101$^b$ will maintain their intermesh with the gear 89 but without any relative meshing of these parts or movement between them so that they will all travel "forward" but without any relative intermeshing of teeth. The same teeth of each of the pinion elements 10$^b$ will maintain contact with the same teeth of the gear element 89. Furthermore, it will be seen that under these conditions the pinion elements 101$^a$ will merely force the gear and clutch member 105 "forward", this being possible since the balls 104 will permit such "forward" movement without resistance, and the same teeth of each of the pinion elements 101$^a$ will maintain contact with the same teeth of the gear element 105. Thus, although the various gears and pinions are always in mesh, there is no intermovement between the intermeshing parts, and therefore there is no friction or wear of the gears during such movement, and no noise from them.

On the other hand, assuming that the belt and pulley member 99 is driven "backwards", the clutch member 93 will disengage from the clutch member 90 and allow the plate 94 to rotate "backwardly" with respect to the shaft 70. This "backward" rotation of the plate 94 will carry with it the studs 100 and the pinion elements thereon. The resistance of the shaft 70 to rotation will at once cause the pinion elements 101$^b$ to rotate on the gear member 89, such rotation being "backwards", and this in turn will cause the pinion elements 101$^a$ to press against the gear member 105, tending to turn the same "backwards". Immediately said gear and clutch member 105 will be clutched by the ball and socket clutch, and will stall. Thereafter, the "backward" movement of the studs 100 traveling with the plate 94 will cause the pinion elements 101$^a$ to rotate on their respective studs and in so doing also to rotate the pinion elements 101$^b$. The latter are of larger size than the pinion elements 101ª and therefore will exert a pressure "forward" against the gear member 89, tending to drive it "forward" and therefore also driving the shaft "forward".

By properly proportioning the sizes of the pinion and gear elements, it is possible to cause a "forward" rotation of the shaft under these conditions at the same number of revolutions per minute as the belt is being driven "backwards". In other words, the device will operate to translate a given number of "backward" rotations into an equal number of "forward" rotations. It will also be noted that the transition from "forward" to "backward" and vice versa will always take place almost immediately when the reversal of direction takes place, since the clutches can be so designed as to operate within a very small angular movement. It will also be noted that the casing may be filled with oil or other lubricant up to a level where the pinion elements 101ª and 101ᵇ will dip into the oil as they come around each time, thereby keeping the device always well lubricated, and operating smoothly.

The pipes 82 and 83 have been spoken of as being of small size, but this is merely relative, since these pipes may be smaller than the pipes 81 and 84 because the air in the pipes 82 and 83 is under heavy pressure. Actually, these pipes will be of such size as may be proper, taking into consideration the volume of air under compression which is to be moved.

It will also be noted that the heat exchanger constitutes in effect a reservoir within which there will accumulate a certain volume of air under compression. Since the air motor commences to rotate as soon as the compressor, it follows that the air delivered from the compressor would be drained away from the heat exchanger reservoir as fast as compressed, so that the pressure would not be built up in the system, assuming that the air consuming capacity of the air motor is as large as the air compressing capacity of the compressor. I have therefore made special provision to insure building up of the pressure within the system to the desired pressure before the compressed air is allowed to commence delivery to the air motor, and for thereafter permitting and causing such delivery of the compressed air to the air motor as long as the desired pressure is maintained. The arrangement is such that in case of lowering of the pressure to a point below the desired minimum, the delivery of air to the air motor will cease until the pressure is again built up to the proper amount.

Reference to Figure 8 shows a control valve in more or less diagrammatic form, which will control the delivery of the air to the air motor, said valve opening and closing from time to time as necessary to permit the delivery of the air to the air motor within the pressure limits desired. This valve includes the valve member 106 (see Figure 8), which, when standing in the position of Figure 8, prevents flow of air along the pipe 83 in the direction of the arrows and therefore causes the pressure to build up on the left hand side of said valve, namely, the compressor and heat exchanger side. There is a stem 107 to which the valve member 106 is connected, and said stem reaches into the housing 108 where it carries a finger 109 by which the stem is rocked back and forth to open and close the valve.

Freely mounted on the stem 107 is an arm 110. A sylphon 111 is placed within the housing 108, said sylphon being anchored at its lower end where it receives the pipe or tube 112 which in turn connects with the entering portion of the pipe 83 on the compressor side. There is a spring 113 pressing against the free end of the arm 110 and holding the same down against the movable end of the sylphon. The compression of this spring can be adjusted by means of a thumb screw 114 so as to adjust the range of pressures within which the device will function. A toggle spring 115 connects the free end of the arm 110 with the end of the finger 109, so that as the arm 110 passes dead center in either direction of movement the finger 109 will suddenly be thrown over in the one direction or the other as the case may be.

It will be evident that with this arrangement the operation is as follows:

Assuming the pressure to the left side of the valve is below the lower limit of the device, the sylphon will be contracted and the parts will be in the position illustrated in Figure 8. As the pressure to the left hand side builds up, the sylphon will expand and move the arm 110 up with it against the spring 113, until finally the spring passes the dead center position and the finger 109 will then be suddenly thrown over in a clockwise direction against the stop 116 so as fully to open the valve and allow free delivery of compressed air to the right hand side of the valve. Upon lowering of the pressure, the operation will reverse and the finger 109 will snap back against the stop 117—the valve being fully closed. The device can be so designed that it will operate within the desired limits of accuracy, and the range of operation may be adjusted from time to time, as may be desired, by adjustment of the thumb screw 114.

I have provided means for filtering the air drawn into the compressor so that the air delivered from the air motor will be clean and free of dust and other foreign matter. Such compressor filter is shown at 118, being located directly in front of the compressor. I have also provided an air filter for removing dust and other foreign matter from the cooling air which is drawn into the heat exchanger by the fan 79, such filter being designated 119, and being located directly in front of the heat exchanger. The detailed construction of the filter 119 is shown in Figures 4, 5 and 6, and is also typical of the construction of the filter 118, which latter therefore does not require detailed description and illustration.

Referring to Figures 4, 5 and 6, the filter therein shown includes a layer or layers or thicknesses of such material as woolen or cotton batting or other material, preferably fibrous, which will permit the air to flow through but will remove the dust and other solid impurities. This layer or layers is shown at 120. It sets back against a flange or support 121, shown in the form of an angle bar, such support being located within the housing of the filter, which, in this case, comprises an extension of the header 77. A strip 122 is set around the edge of the layer 120 and retains said layer effectively in place. Two or three layers of screening 123 are set against the strip 122 and are retained in place by the encircling strip 124, illustrated in the form of an angle member having one of its legs overlying the edge portion of the screening. In order to protect the filter from direct action of rain, snow and other elements, I have provided a guard plate 124ª which overlies the face of the filter, but the edges of this guard plate are spaced away from the edge portion of the filter proper so that the air can enter the filter and flow to the screen. This guard plate 124ª is supported by brackets 125, and the arrangement is preferably such that the guard plate may be readily drawn away from the housing of the filter in order to give access to the filter element and the screen.

When the guard plate has been removed, the screen 123 and the angle plate 124 may be slipped away from the housing so as to give direct access to the filter element 120 for cleaning the same. Such cleaning can be accomplished by the use of a brush or a vacuum cleaner run over the surface of the element 120, since most of the dust and other solid matter will be deposited on the outer surface thereof.

It will be noted that the cooling air which flows over the tubes 76 of the heat exchanger will be heated thereby, so that the air delivered through the header 78 will be hot. In some cases it may be desired to supply heated air to the interior of the car body—as, for example, in extremely cold weather—in order to prevent freezing of the contents of the car. I have therefore provided a delivery connection 125ª leading from the header 78 so that the heated air from the heat exchanger will flow out through this connection 125ª. This connection 125ª is also provided with an end fixture 126 similar to the fixture 85 on the pipe 84, so that when it is desired to supply the interior of the car with heated air, the nipple 38 on the end of the flexible connection 37 may be connected into the fixture 126 instead of the fixture 85. The cold air from the air motor will then be delivered to the outside atmosphere and the heated air from the heat exchanger will be delivered to the interior of the car body.

Any moisture or condensation collecting within the heat exchanger will collect in the bottom of the headers and may be drawn off from time to time through the pet cock 127 shown in Figure 4.

A suitable housing or guard may be provided around the compressor, motor, and other elements, the same being designated by the numeral 128. If desired, this housing, or portions thereof, may be heat-insulated, or, in some cases, it may be desirable to heat-insulate the cylinders and other portions of the air motor, since the same will run cold. Similarly, the various ducts and passages which carry cold air may be advantageously heat-insulated to the necessary degree.

It may be desirable to provide for automatic regulation of the temperature within the car body. In this connection, it will be noted that the rate of cold air delivery into the car body will be dependent on the rate of car travel, in case the full volume of the cold air from the air motor is constantly delivered into the car body. I have provided a valve 129 in the duct or passage 36, said valve including a side delivery connection 130 through which the air or a portion of the air flowing from the refrigerating unit may be delivered to the outside atmosphere. This valve 129 is connected to a thermostat 131 located within the car body at the desired point, such connection being made by means of the tube 132 in the usual manner, so that the opening and closing of the valve 129 will be controlled by the temperature within the car body. When the temperature is above a predetermined amount, the valve 129 delivers the full volume of air into the car body, but when the temperature falls below such amount the valve 129 delivers a portion or all of the cold air to the outside atmosphere instead of into the car body, therefore decreasing the cooling action to the proper amount.

It will be noted that the connection 37 is flexible so that it may take up for truck movements, and may be so proportioned that it may be turned out to reach beyond the side of the car body and be connected to a pre-cooling plant. In Figure 12, I have shown several cars numbered 133, 134 and 135 located on the track 136 within or alongside of the housing 137. There is diagrammatically shown the refrigerating plant 138 which delivers cold air to the main 139, and said main is provided with connections 140, 141 and 142 corresponding to the various cars which are to be simultaneously pre-cooled. Each of these connections includes a valve 143 which delivers the cold air through a flexible connection or extension 144.

The extensions 144 are provided with fixtures 145 to receive the nipples or sleeves 38 of the flexible connections 37 of the respective cars. The arrangement is therefore such that the refrigerating ducts of the several cars can be connected to the common cold air supply system, and by opening the valves 143 the cars can be supplied with cold air for the pre-cooling operation. During this pre-cooling, the cars should be shut up or closed so that there will be no wastage of the cooling effect and so that the incoming cold air in each car will displace the warmer air therefrom through the ducts 31 and the vent fixtures 33 near the roof of the car.

As soon as the pre-cooling operation has been completed, the nipples 38 of the different connections 37 of the cars may be withdrawn from the pipes 144, the valves 143 having been closed, and then the nipples 38 may be connected into the cold air delivery fixtures 85 of the respective cars and the train may be sent out on the road and the refrigerating action will proceed in each car to maintain the temperature thereof at the desired low point. It is especially noted that during this pre-cooling operation, there is no wastage of the cooling action by cooling unnecessary portions of the cars, since the only portion of each car subjected to the cooling action is the interior thereof, including the contents which should be cooled. Furthermore, this pre-cooling action proceeds in the same way, as far as the interior of the car is concerned, as the subsequent normal cooling action when on the road.

It will also be noted that the fan 79 should always rotate in the same direction irrespective of the direction of car travel. This result is also obtained by use of the direction changer which causes the shaft 70 always to rotate in the same direction irrespective of direction of car travel.

I wish to point out the fact that as far as the features of the invention are concerned, they may be used in many other arrangements and details of construction than those herein set forth. Furthermore, the arrangement herein disclosed is especially intended for refrigerating car construction and refrigeration, but certain of the features herein set forth may also be used to advantage for the refrigeration of other kinds and types of cars than refrigerating cars. It is noted that the arrangement is one in which the refrigerating action within the car is provided by actually introducing into the body of the car a supply of fresh air from the outside which is cooled by direct expansion and without the need of interposing refrigerating units wherein the cold is produced by a medium such as ammonia or sulphur dioxide or carbon dioxide or the like, and which media are very undesirable for the present use for various reasons, some of which have been set forth previously herein. Further, the present system is one in which there is no gas or air under pressure introduced into the body of the car itself, but the air is fully expanded back to what is practically atmospheric pressure before it is introduced into the car body. This eliminates the need of using pipes in the car which are capable of withstanding high pressures for which they must be sealed.

While I have herein shown and described only certain embodiments of my present invention, still I do not intend to limit myself thereto except as I may do so in the claims.

What I claim is:—

1. Means for delivering a supply of cooled air comprising a compressor, a heat exchanger having compressed air passages and also having cooling air passages, an air motor, connections from the air compressor to the compressed air passages of the heat exchanger and from the compressed air passages of the heat exchanger to the air motor, and means in said last named connections for interrupting flow of compressed air from the heat exchanger passages to the air motor when the pressure within the compressed air passages of the heat exchanger is less than a certain amount, substantially as described.

2. Means for delivering a supply of cooled air comprising an air compressor, an air motor, means for cooling the compressed air, connections between the air compressor and the air motor for delivery of a supply of compressed air from the one to the other, and means in said connections for discontinuing such supply of compressed air when the pressure of the air in said connections is less than a predetermined amount, substantially as described.

3. Means for delivering a supply of cooled air comprising an air compressor, an air motor, connections from the compressor to the air motor for delivering the compressed air from the one to the other, and means in said connections for discontinuing delivery of the air to the motor when the pressure within said connections is less than a predetermined amount, substantially as described.

4. Means for cooling and conditioning air comprising an air compressor having a low pressure inlet connection and a high pressure delivery connection, an air motor having a high pressure inlet connection and a low pressure delivery connection, means for transferring high pressure air from the compressor delivery connection to the motor inlet connection including a heat exchanger for cooling the pressure air without loss of pressure and with precipitation of moisture and a cut-off valve, means for automatically operating said cut-off valve to discontinue delivery of pressure air from the heat exchanger to the motor below a selected pressure, and a connection for delivery of condensation moisture from the heat exchanger, substantially as described.

5. Means for delivering a supply of cooled air to a vehicle comprising an air motor and an air compressor mounted upon a truck of the vehicle and upon a common shaft for simultaneous operation, connections between the delivery side of the air compressor and the inlet side of the air motor, a heat exchanger in said connection between said compressor and motor, and control means between said heat exchanger and motor for automatically discontinuing delivery of compressed air below a predetermined pressure whereby to initially build up and maintain the desired pressure in the system before delivery of compressed air to the motor begins.

6. In an air conditioning system for vehicles comprising means to place the air under plenum and advance the air, means carried upon a truck of the vehicle for cooling the air so advanced including an air motor for delivering air to the vehicle and for automatically discontinuing delivery of such air to the motor below a predetermined pressure, and temperature controlled means carried by the body of the vehicle and actuated to deliver a given volume of cooled air to the vehicle when the temperature is above a predetermined thermostatic setting and a portion or all of such air to the outside atmosphere when the temperature falls below said thermostatic setting.

THOMAS A. BANNING, Jr.